Nov. 2, 1943
D. D. PEEBLES ET AL
2,333,333
DESICCATING APPARATUS AND METHOD
Filed Jan. 24, 1940
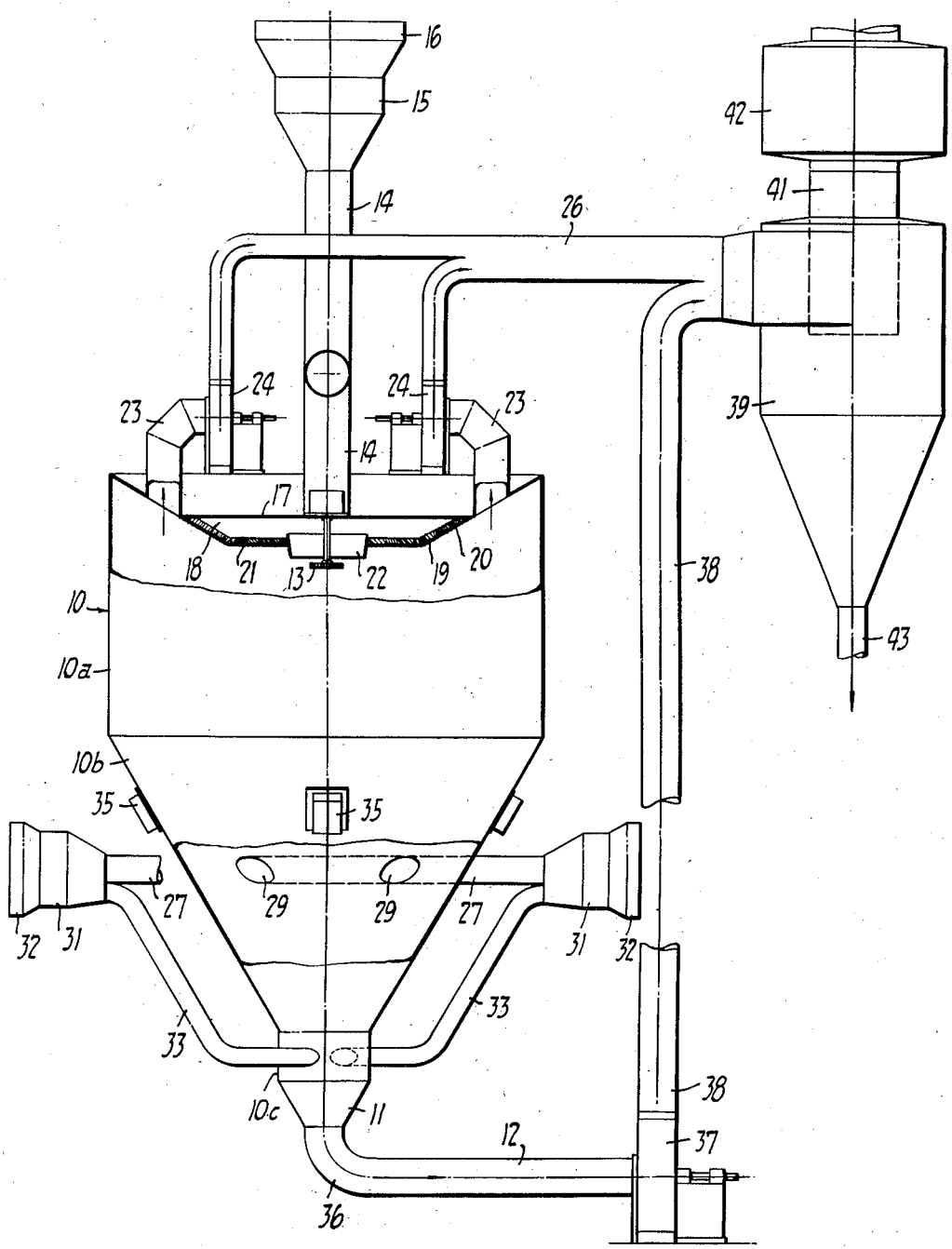
INVENTORS
DAVID D. PEEBLES
PAUL D. V. MANNING
BY
ATTORNEY Patented Nov. 2, 1943

2,333,333

UNITED STATES PATENT OFFICE 2,333,333

DESICCATING APPARATUS AND METHOD

David D. Peebles, Berkeley, and Paul D. V. Manning, Berkeley Woods, Calif., assignors to Golden State Company, Ltd., San Francisco, Calif., a corporation of Delaware Application January 24, 1940, Serial No. 315,432

7 Claims. (Cl. 159—4)

This invention relates generally to apparatus and methods for the desiccation of materials of the type which when dehydrated, form relatively low melting point solids. The invention is particularly applicable to syrups resulting from the conversion of starch or starch bearing materials, such as the so-called "corn syrup" manufactured by the conversion of starch obtained from Indian corn.

Syrups obtained from the conversion of starch contain varying percentages of several sugars, including particularly dextrose and maltose, together with dextrines. When dehydrated to the extent of say two or three per cent moisture, such syrups form solids which soften at relatively low temperatures, depending upon the extent of conversion and the amount of moisture. For example, a syrup having a dextrose equivalent of 42% and a moisture content of 5% becomes sticky at about 110° F., while at 2% moisture it is sticky at about 155° F. In the United States such syrups are usually manufactured by hydrolysis or conversion of starch produced from Indian corn. The proportioning of the various sugars present depends upon the extent of conversion, and varies with different grades and types of commercial corn syrups.

In the past corn syrups have been converted to solid form by first concentrating the syrup, and then subjecting it to further drying under partial vacuum, after which it is allowed to cool and harden in forms. The hardened slabs are then ground to form a divided material of the desired fineness.

The spray drying of such syrups has in the past been commercially impractical since conventional spray drying equipment is virtually unworkable when supplied with such material. Instead of discharging from the desiccating chamber as a powder, a large amount of the material tends to adhere to and accumulate on the inner walls of the chamber. This tendency of the material to adhere to the walls of the desiccating chamber is attributed to the relatively low melting or softening point of the dried or partially dried material, and to the further fact that the melting point is dependent upon moisture content, and decreases with an increase in moisture. Thus, when particles undergoing drying in the desiccating chamber contact the side walls, there is a strong tendency for the particles to adhere and melt, and after particles have once commenced to adhere to the side walls further accumulation and agglomeration of solids occur at a rapid rate.

It is an object of the present invention to provide a desiccating apparatus and method making possible successful commercial desiccation of syrups of the type described above, and particularly corn syrups.

More particularly, it is an object of the present invention to provide a desiccating apparatus and method which in its operation with materials like corn syrups will be relatively free from adherence of material upon the side walls of the desiccating chamber, and which will make possible continuous operation at relatively high capacities.

Further objects of the invention will appear from the following description in which the preferred embodiment of the invention is set forth in detail in conjunction with the accompanying drawing. The single figure of the drawing illustrates diagrammatically apparatus incorporating the present invention and capable of carrying out the method which will be presently described.

The apparatus illustrated in the drawing consists of a desiccating chamber 10, which preferably includes an upper substantially cylindrical shaped portion 10a, and a lower substantially conical shaped portion 10b. At the lower end of portion 10b there is a cylindrical shaped extension 10c, which has a lower cone 11 connecting to the discharge conduit 12. A centrifugal atomizing nozzle 13 is shown located in the upper portion of the chamber aligned with the vertical axis of the chamber.

Hot drying gas such as heated air is introduced into the upper portion of the chamber in the region of the atomizing nozzle 13. Thus, with the construction illustrated, hot air is introduced through the conduits 14, which have their outer ends connected to the heater 15 and air filter 16. The discharge ends of conduits 14 open through the wall 17, which in turn forms the upper wall of a chamber 18. Chamber 18 is formed by the inverted conical shaped wall 19, together with wall 17, and the lower horizontal wall 21. A conical shaped collar 22 is mounted centrally of wall 21 and serves to conduct the hot gas downwardly about the centrifugal atomizing nozzle 13. The lower walls of chamber 18 are lined with heat insulating material 20.

A certain amount of air is removed from the upper portion of the chamber through the exhaust conduits 23. These conduits are shown communicating through the conical shaped wall 19, and they connect with the inlets of blowers 24. A common conduit 26 may receive the discharge from both blowers.

In conjunction with the lower part of the desiccating chamber, means is provided for additional introduction of drying gas. Thus, conduits 27 communicate through the side walls of the conical portion 10b at several points, with the discharge arranged to be tangentially of the desiccating chamber. In this instance two general points of introduction of gas are shown for each conduit 27, with the flow of gas being in a tangential direction. Conduits 27 connect with heaters 31, and also the air filter 32.

Additional drying gas is introduced into the lower extension 10c. Thus, conduits 33 are provided for this purpose, with the conduits communicating through the side walls of extension 10c, and with the flow being directed in a tangential direction. The direction of introduction of gas into the extension 10c is the same as for the conduits 27. Gas introduced through conduits 33 is also heated, and in the drawing the conduits are shown connected to the same heaters 31 as employed with conduits 27.

Both divided material and gas are removed through conduit 12, and to avoid any possible accumulation of material in the connection to the desiccator, the conduit 12 includes a curved section 36 which establishes communication with the conical portion 11.

As added means to prevent any tendency of material to adhere to the walls of conical portion 10b, a plurality of vibrators 35 are mounted upon these walls. The vibrators can be of the type energized by 60 cycle alternating current, and known by the trade name of Syntron vibrators. Such vibrators serve to rapidly vibrate the side walls in a direction laterally of the general plane of the walls.

As representative of suitable apparatus for effecting separation and further treatment of the dried material, I have shown conduit 12 connected to a blower 37 which discharges to a separator 39. Separator 39 is of the cyclone type, and exhaust conduit 41 may connect with a washer 42 for removing any remaining solid material. Conduit 26 can also discharge into separator 39, so that any dried material carried out through this conduit will be largely separated out, and any remaining in the exhaust removed in the washer 42. Material collected in the separator 39 is immediately discharged at 43, and may be treated to further reduce its temperature to a value suitable for sacking, such as a temperature below 100° F.

Operation of the apparatus described above and the carrying out of the present method can be described as follows: The corn syrup to be desiccated is refined, evaporated and decolorized to produce a clear concentrated syrup containing say from sixty-five to seventy-five per cent solids. This concentrated syrup is then rapidly preheated to an elevated temperature of the order of from 220 to 260° F., by passing it through a closed heater and with the syrup being heated under pressure. The preheated syrup is then immediately supplied to the atomizing nozzle 13. Hot air is introduced through conduit 14 at a temperature dependent upon its humidity, as will be presently explained. Air at a considerably lower temperature is withdrawn by blowers 24. Warm air is introduced into the lower conical shaped portion 10b, through conduit 27, at a temperature somewhat lower than the air introduced through conduit 14. Air introduced through conduits 33 can be at the same general temperature as for conduits 27.

As an example of values which have been obtained from actual practice, with a desiccating chamber measuring 18 feet in diameter, air containing 1.53 pounds of moisture per 100 pounds of dry air, was introduced through conduits 14 at a temperature of 318° F. Air at a temperature of 236° F. and containing 3.44 pounds of moisture per 100 pounds of air was removed through combined conduits 23 at a rate of approximately 20,000 cubic feet per minute. Air was introduced through conduits 27 at a temperature of 200° F. at a combined rate of 8,000 cubic feet per minute, and containing the same amount of moisture as the air introduced through conduits 14. Air introduced through conduits 33 had the same temperature and relative humidity as the air in conduits 27, and was introduced at the approximate rate of 1,750 cubic feet per minute through each opening. Air withdrawn through conduit 12 was at a temperature of 192° F., at a rate of approximately 8,000 cubic feet per minute, and contained 3.55 pounds of moisture per 100 pounds of dry air.

The hot air introduced through conduits 14 and collar 22 creates a zone of primary desiccation into which the concentrated syrup is atomized. The atomized particles are suspended in the drying gas and undergo flash evaporation. Such flash evaporation rapidly reduces the temperature of the particles and also chills the air surrounding each particle as the evaporation proceeds. As a result, there is substantially instantaneous removal of moisture accompanied simultaneously by transition from liquid to solid form. The chilled air surrounding a solid particle after this transition has a wet bulb temperature well below the softening point of the particle, and a relative humidity well below saturation and such that there is no tendency for moisture to be reabsorbed by the particle.

During desiccation as described above, because of radiation the walls of chamber portion 10a assume generally a temperature somewhat lower than the dry bulb temperature of the chilled air leaving the primary zone of desiccation, and this temperature is such that when solid particles contact these side walls there is no great tendency to adhere, since there will be negligible heat flow from the walls to the particles. At the same time these walls must be maintained at a temperature sufficiently above the dew point so that condensation of moisture on the walls with consequent reabsorption of moisture by the powder cannot take place.

In the immediate region of the nozzle 13, rotary motion of the air is intense. Outwardly along the vertical walls of the portion 10a, there is little rotary motion. In the lower portion of the chamber the vortex is intense. A great majority of the atomized material progresses downwardly, although a small amount may be withdrawn through the conduit 23. As the atomized material progresses downwardly, it continues to lose moisture, and its velocity of swirling movement increases rapidly. Drying is continued while in the region of the conical portion 10b, particularly since the hot air introduced through conduits 27 has the same content of moisture as the air entering through the collar 22. This drying occurs while the particles are in solid form, since the particles are maintained at temperatures below their melting points by evaporation.

As the atomized particles continue to progress downwardly through the conical portion 10b, swirling velocity continues to increase and becomes most intense as the particles pass through the extension 10c. This is in part due to the added swirling movement caused by the conduit 33, and also because of the general downflow of swirling gas through portions of the desiccating chamber of progressively decreasing cross sectional area. The intense vortex tends to cause not only an effective sweeping of the side walls of the desiccating chamber, but in addition tends to cause particles to be carried inwardly and out of the chamber from the lower apex of the vortex.

In a typical instance, the solid material removed through conduit 12 may contain from 2½ to 3½% moisture. While in transit through conduit 12, conduit 38, and while in suspension within cone 39, some further moisture evolution occurs, due to the drying effect of the warm conveying air, thus normally reducing the moisture content to 2% or under. At all points in the system, after changing from liquid to solid form, the relative humidity is such that the wet bulb temperature is well below the melting point of the material.

Vibrators 35 greatly aid in preventing accumulation of material upon the side walls of the conical portion 10b, and may be operated continuously or intermittently as required.

The method should be properly controlled to secure operation as described above. Particularly, care should be taken to control the inlet temperature to compensate for changes in humidity of the atmosphere. In general, as the humidity of the atmosphere increases, the temperature of air introduced through conduits 14 should be decreased, so that the humidity of air withdrawn from conduits 23 will not be too high.

The particles tend to be somewhat case hardened in the zone of primary desiccation. Should case hardening continue too far at this point, it would tend to inhibit evaporation of moisture and thus cause the particle to assume the dry bulb temperature of the surrounding gas. In the present process, particles are removed from the primary zone before this can occur, and in the secondary zone there is an opportunity for the outer shell to be remoistened by moisture within the particle, with further evaporation of moisture from the particle.

The apparatus and method described above are being used to economically and commercially dry corn syrups to form relatively stable divided products. The product produced by desiccation of typical corn syrups is a white powder, of noncrystalline character, having a high degree of solubility. In general, such a product has been found to be of better quality than a product produced from the same syrup by conventional drying and grinding.

A particular feature of the apparatus and method is its ability to operate continuously at high capacity. Thus, in actual commercial operations we have employed a dryer continuously for periods of more than eight days without appreciable adherence of material on the walls of the desiccator, and with an average capacity of approximately 2,000 pounds of powder per hour. No comparable results have been obtained by prior methods.

One feature of our apparatus and method is that it avoids the use of cool gases within the desiccating chamber for chilling the particles for the purpose of changing them from liquid to solid form. Such cool gases dilute the hot desiccating gas, and greatly interfere with capacity. Our method also makes possible the use of syrups of high gravity, which is a further feature making for high capacity and especially for economy of operation.

The centrifugal atomizing nozzle contributes to the results desired, since it makes possible relatively fine atomization of high gravity syrups at high capacities. Also, such a nozzle facilitates formation of a zone of primary desiccation such as described above with intense swirling movement of air in the vicinity of the nozzle, and with flow of chilled gas from the primary zone into contact with the walls of portion 10a, and with proper progression of the solid particles downwardly into the secondary zone.

While the invention is particularly applicable for use with corn syrup, it is applicable to other materials tending to have somewhat similar characteristics, such as molasses.

We claim:

1. In desiccating apparatus of the character described, a desiccating chamber, the lower portion of the chamber being substantially conical shaped and having a substantially cylindrical extension secured to the lower end of the conical shaped portion, a discharge conduit connected to the lower end of the extension and adapted to remove divided solid material together with gas, means for atomizing material to be desiccated in the upper portion of the chamber, means for introducing hot drying gas into the chamber in the region of the atomizing means, means for introducing additional drying gas tangentially into the conical shaped portion of the chamber, and means for introducing additional drying gas tangentially into the substantially cylindrical extension.

2. In desiccating apparatus of the character described, a desiccating chamber, said chamber having an upper portion of cylindrical form and lower portion of an inverted conical form, atomizing means in the upper portion of the chamber, means for introducing a hot drying gas into the chamber in a region adjacent the atomizing means, a discharge conduit connected to a lower outlet of said lower portion of the chamber, said lower portion providing an unobstructed flow to said outlet, and means connected to the chamber in the region of the outlet for introducing drying gas in a tangential direction.

3. In desiccating apparatus of the character described, a desiccating chamber having an upper portion of cylindrical form and a lower portion of an inverted conical form, centrifugal atomizing means in the upper portion of the chamber, means for introducing a hot drying gas into the chamber to surround the conical spray from said atomizing means, a discharge conduit leading from the lower end of said lower portion, and means connected to the chamber in the region of the outlet for introducing drying gas in a tangential direction, the lower portion of said chamber providing an unobstructed flow for said last introduced gas to said outlet.

4. In desiccating apparatus of the character described, a desiccating chamber, the lower portion of the chamber being substantially conical shaped and having an extension secured to the lower end of the same, a discharge conduit connected to the lower end of the extension and adapted to remove divided solid material together with gas, means for atomizing material to be desiccated in the upper portion of the chamber, means for introducing hot drying gas into the chamber in the region of the atomizing means, means for introducing additional drying gas tangentially into the conical shaped portion of the chamber, and means for introducing additional drying gas tangentially into the extension.

5. In a method of desiccating corn syrup, the steps which comprise, preheating the syrup to a temperature which will render the syrup fluid, supplying the heated syrup as atomized particles to a primary desiccating zone, supplying hot drying gases to said primary zone having a temperature and moisture content causing the atomized particles to be subjected to evaporation at a sufficient rate to dry and chill the surfaces of the particles to a moisture content and temperature below that at which the particles are sticky, progressing the particles while still containing moisture therein and without rest from the primary zone into a secondary drying zone, supplying a heated drying gas to the secondary zone at a humidity lower than that of the gas in the primary zone immediately surrounding the particles during the latter portion of said evaporation so as to maintain the particles in non-sticky condition by further drying the particles in said secondary zone to produce the desired desiccated product.

6. In a method of desiccating corn syrup, the solids of which have the property of being sticky at moisture contents of from 2–5% at temperatures of the order of 110–155° F., the steps which comprise rapidly heating syrup containing about 65–75% solids to an elevated temperature of the order of 220–260° F., supplying the heated syrup as atomized particles to a primary desiccating zone, supplying hot drying gases to said primary zone having a temperature and moisture content causing the atomized particles to be subjected to evaporation at a sufficient rate to dry and chill the surfaces of the particles to a moisture content and temperature below that at which the particles are sticky, progressing the particles while still containing moisture therein and without rest from the primary zone into a secondary drying zone, supplying a heated drying gas to the secondary zone at a humidity lower than that of the gas in the primary zone immediately surrounding the particles during the latter portion of said evaporation so as to maintain the particles in non-sticky condition by further drying the particles in said secondary zone to produce the desired desiccated product.

7. In a method of desiccating corn syrup, the solids of which have the property of being sticky at moisture contents from 2–5% at temperatures of the order of 110–155° F., the steps which comprise rapidly heating syrup containing about 65–75% solids to an elevated temperature of the order of 220–260° F., supplying the heated syrup as atomized particles to a primary desiccating zone, supplying hot drying gases to said primary zone having a temperature and moisture content causing the atomized particles to be subjected to evaporation at a sufficient rate to dry and chill the surfaces of the particles to a temperature below that at which the particles are sticky, progressing the particles while still containing moisture therein and without rest from the primary zone into a secondary drying zone, supplying a heated drying gas to the secondary zone at a temperature lower than that supplied to the primary zone and at a humidity lower than that of the gas in the primary zone immediately surrounding the particles during the latter portion of said evaporation so as to maintain the particles in non-sticky condition by further drying the particles in said secondary zone to produce the desired desiccated product.

DAVID D. PEEBLES.
PAUL D. V. MANNING.